United States Patent [19]
Laymon

[11] 3,903,512
[45] Sept. 2, 1975

[54] SIGNAL PROCESSOR
[75] Inventor: Marvin D. Laymon, Milpitas, Calif.
[73] Assignee: GTE Sylvania Incorporated, Mountain View, Calif.
[22] Filed: Mar. 7, 1974
[21] Appl. No.: 448,808

[52] U.S. Cl............. 340/261; 340/16 R; 340/258 D
[51] Int. Cl.² ........................................ G08B 13/00
[58] Field of Search............... 340/258 D, 261, 16 R

[56] References Cited
UNITED STATES PATENTS

| | | | |
|---|---|---|---|
| 3,686,658 | 8/1972 | Wilt.................................... | 340/261 |
| 3,696,369 | 10/1972 | Laymon et al.................. | 340/261 X |
| 3,745,552 | 7/1973 | Wilt................................... | 340/261 |
| 3,824,532 | 7/1974 | Vandierendonck............. | 340/261 X |
| 3,828,170 | 8/1974 | Lee et al.......................... | 340/261 X |

Primary Examiner—David L. Trafton
Attorney, Agent, or Firm—John F. Lawler; Norman J. O'Malley; Elmer J. Nealon

[57] ABSTRACT

Electrical signals generated by a geophone sensor in response to seismic vibrations are processed by an envelope detector, the output of which is applied to three processing channels comprising (i) a summing amplifier with two inputs connected to the envelope detector output directly and through an averaging circuit, (ii) an averaging circuit, and (iii) a half-wave rectifier and an averaging circuit connected to the summing amplifier output. The outputs of these three channels, respectively, correspond to (i) peak amplitude variance, (ii) average envelope, and (iii) average variance, the algebraic sum of the latter two being applied along with the first to a summing network. The frequency of the sensor output signals is quantified in another channel by a detector, a differentiator, a half-wave rectifier, and an averaging circuit to produce a signal representing the average frequency which is applied to the same summing network. The output of this summing network corresponds to seismic signals produced by footsteps of a human as distinguished from those produced by a moving vehicle and is applied to a threshold circuit which actuates an alarm circuit when a predetermined threshold is exceeded.

4 Claims, 4 Drawing Figures

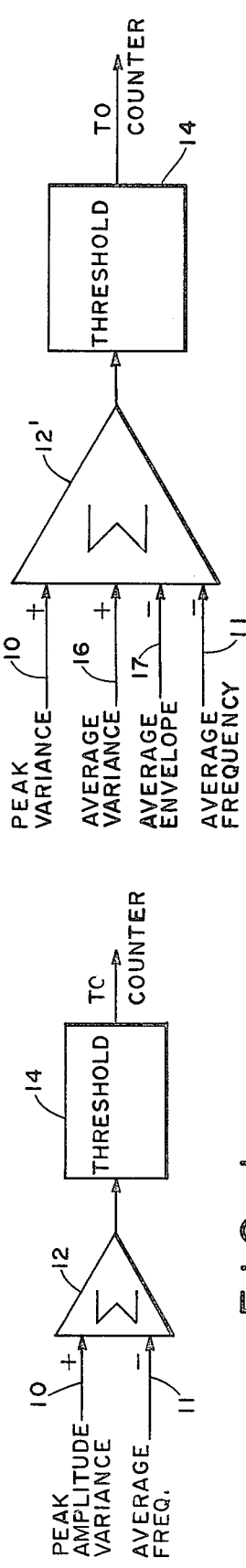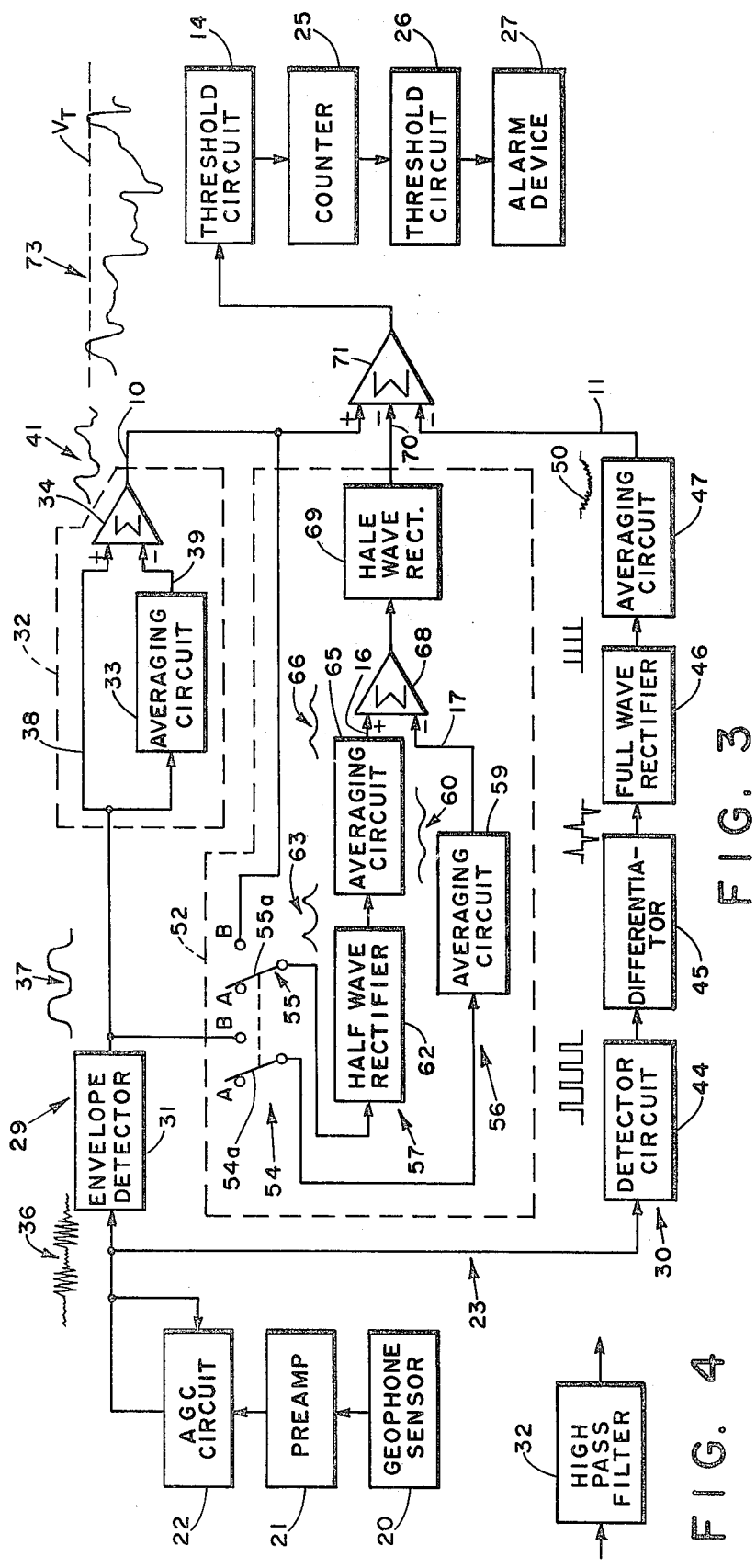

SIGNAL PROCESSOR

BACKGROUND OF THE INVENTION

This invention relates to seismic intrusion detection systems and more particularly to an improved signal processor capable of distinguishing between different types of targets. More specifically, this invention concerns an improvement to the invention described in U.S. Pat. No. 3,696,369 assigned to the assignee of this invention.

The system described in U.S. Pat. No. 3,696,369 is effective in detecting both walking (or running) humans and moving vehicles by processing signals from seismic vibrations produced by these sources while discriminating against signals from false alarm sources such as low flying aircraft, wind, rain, thunder and the like. There are some applications, however, that require the further capability of distinguishing a walking or running human from a moving vehicle, an example of such application being an area around or near which vehicular traffic is a common expected occurrence but through which human traffic is forbidden. Such an area might, by way of example, be an airport. The system described in the above patent is incapable of making this distinction.

SUMMARY OF THE INVENTION

An object of the invention is the provision of a seismic intrusion detection system capable of discriminating between a walking (or running) human and a moving vehicle as well as distinguishing these targets from low flying aircraft and environmental sounds.

Another object is the provision of an improvement to the detection system described in the foregoing patent to enable discrimination between seismic signals produced by a walking or running human and a moving vehicle.

In accordance with this invention, the average envelope amplitude and the average amplitude variance of electrical signals from a seismic sensor are summed with peak amplitude variance and average frequency to influence a threshold level relative to the peak variance so as to distinguish signals of a walking man from those of a moving vehicle. The average envelope amplitude and the average amplitude variance are greater and lesser, respectively, for a vehicle signal than such amplitude and variance are for a walking human and, when produced by a vehicle, are applied so as to increase and to decrease, respectively, the threshold level relative to the peak variance. When the signal is produced by a walking or running man, the peak variance exceeds the threshold and an alarm is generated; when produced by a moving vehicle, such variance does not exceed the threshold and the alarm is not actuated.

DESCRIPTION OF THE DRAWINGS

FIG. 1 is a schematic representation of part of the prior art circuit used for discriminating signals produced by human footsteps and moving vehicles from those produced by false alarm sources;

FIG. 2 is a schematic diagram similar to FIG. 1 and modified in accordance with this invention to provide discrimination between human footsteps and moving vehicles; and FIG. 3 is a block diagram of the entire prior art circuit modified in accordance with this invention;

FIG. 4 shows a practial embodiment of the network 32 of FIG. 3.

DESCRIPTION OF PREFERRED EMBODIMENT

Since this invention concerns an improvement to the processor described in U.S. Pat. No. 3,696,369, a description of that processor will now be given to assist in better understanding the invention.

The signal processor described in the above patent discriminates the burst-type seismic signals produced by both the footsteps of a human and the wheels of a vehicle passing over the ground from seismic signals generated by low-flying aircraft, thunder, rain, wind and the like. This discrimination is based on the differences in the nature of the seismic signal produced by these sources. Burst-type seismic signals produced by human footsteps are periodic and those produced by a moving vehicle occur at a more random rate. The rate at which burst signals occur for a moving vehicle is determined by the conditions such as irregularities of the road, hardness of the soil and the like; the same is true of the amplitude of signals produced by a walking or running man. A burst signal produced by such sources is characterized by abrupt changes in envelope amplitude (i.e., short rise and fall times), a short duration, an average value of the envelope signal which is much less than the instantaneous peak amplitude variance when the envelope signal is averaged over a time interval long compared to the envelope rise time, and a concentration of relatively low frequency spectral components typically less than 40 Hz but extending in some instances above 70 Hz. The rise time of a burst signal envelope typically is less than 0.1 second and its duration is normally between 0.15 and 0.3 seconds. The frequency of a strong or predominant spectral component (herein referred to as fundamental frequency) in the burst signal is generally between 20 and 40 Hz. The exact values of these parameters may vary somewhat from the nominal values described herein depending on the composition of the earth in which the seismic vibrations are sensed.

Continuous seismic signals of the type produced by thunder, low flying aircraft, etc. are characterized by a gradual increase and decrease in the envelope amplitude (i.e., long rise and fall times), slowly varying changes in envelope amplitude throught the duration of the signal, a duration that is much longer than that of the seismic burst signal, an instantaneous peak envelope amplitude or peak variance that is approximately equal to the average value of the envelope signal when this signal is averaged over a time interval that is short compared to the rise time of the envelope, and spectral components that may extend over a broad band of frequencies much greater than 40 Hz. The fundamental frequency corresponding to the strong or predominant spectral component of such continuous signal may therefore be much higher than that of a burst signal. A signal comprising strong spectral components concentrated in a narrow band of frequencies having an upper frequency less than 40 Hz, however, may also be a continuous signal. The rise time of the envelope of a continuous seismic signal is generally longer than one second which is more than ten times that for a burst signal. The duration of a continuous signal is typically several seconds, although such a signal may extend for much longer periods. It will be noted that the duration of this signal is more than an order of magnitude longer than that of a burst signal.

Based on these relationships, the processor of the foregoing patent derives signals corresponding to the peak amplitude variance and average frequency and applies these signals as inputs on lines 10 and 11, see FIG. 1, to a summing amplifier 12, the output of which is applied to a threshold circuit 14. The signals on lines 10 and 11 are of opposite sense as indicated by the plus and minus signs respectively associated with them and the predetermined level of threshold circuit 14 is therefore exceeded only when burst signals produced by humans and vehicles are detected by the seismic sensor. The output of threshold circuit 14 is applied to counters in the alarm circuits to indicate detection of the desired targets.

The present invention is based on the further determination that additional characteristics of the derived signals are available to distinguish those produced by a human from those generated by a moving vehicle. These additional parameters are the average envelope amplitude and the average amplitude variance. Average envelope amplitude is defined as the time integral of peak envelope amplitude. Average amplitude variance is defined as the time integral of peak amplitude variance.

Analysis of signals produced by the footsteps of a running or walking man indicates that the average amplitude of the signal envelope is less than the average amplitude variance. On the other hand, signals produced by a moving vehicle have an average envelope amplitude that is generally greater than the average amplitude variance of those signals. In accordance with this invention, signals corresponding to average amplitude variance, called average variance, and average envelope amplitude, called average envelope, are applied as inputs on lines 16 and 17, respectively, along with the inputs on lines 10 and 11 to summing amplifier 12', the output of which is passed to threshold circuit 14'. The sense of inputs on lines 16 and 17 are opposite each other as indicated by the plus and minus signs, with the signs of inputs on lines 10 and 16 being alike and opposite to the signs of inputs on lines 11 and 17. For a moving vehicle input, the average envelope tends to be greater than the average variance, thus causing the effective threshold to increase, resulting in less probability of detection. For a footstep input, the average variance tends to equal or exceed the average envelope, thus canceling the effect of the average envelope and retaining the original threshold or reducing it. The high peak variance thus easily exceeds the threshold.

Another way of viewing the plus or minus effects of the four inputs to the summing amplifier 12' is that the effect of peak variance and average variance signals is to tend to lower the threshold level whereas the average envelope and average frequency signals tend to raise the threshold level. Accordingly, the likelihood of the peak variance signal exceeding the threshold level of circuit 14 for producing an alarm is greater when the value of peak variance and average variance signals increase and this likeihood is less when increases occur in the average envelope and average frequency signals. By selective connection of the average variance and average envelope signals to the summing amplifier, then, the discrimination capability of the circuit is enlarged to permit distinguishing between human footsteps and a moving vehicle.

Referring now to FIG. 3, a block diagram of the entire detection and processing circuit including the modification embodying this invention is shown. The portion of the circuit described in the foregoing patent comprises the series combination of a seismic sensor 20, amplifiers 21 and 22, signal processor circuit 23, a first threshold circuit 14, counter 25, a second threshold circuit 26 and alarm device 27. The waveforms in FIG. 3 illustrate the operation of the system is response to burst-type seismic vibrations characterizing human footsteps on the earth.

Processor circuit 23 comprises envelope amplitude variation channel 29, frequency channel 30 and summing amplifier 71. Channel 29 includes an envelope detector 31 and a network shown in the broken line rectangle 32 comprising averaging circuit 33 and summing amplifier 34. Circuit 31 detects seismic signal 36 corresponding to bursts produced by footsteps for producing envelope signal 37 having an amplitude proportional to the instantaneous amplitude of the seismic signal. Signal 37 is applied directly on line 38 as the first input to amplifier 34 and the output of circuit 33 is applied on line 39 as the second input.

Circuit 33 is responsive to envelope signal 37 for producing an output signal having an amplitude proportional to the average value of the detected signal but with opposite polarity. The average value means the value of the detected signal 37 averaged by circuit 33 over a time interval determined by the circuit time constant. The time constant of circuit 33 is selected to effectively delay the detected signal 37 long enough to make the algebraic sum of the signals on lines 38 and 39, respectively, exceed a prescribed threshold level for burst-type signals and at the same time short enough to make the algebraic sum of these signals less than the prescribed threshold level for continuous seismic signals. Circuit 33 may, by way of example, be a simple single pole integrator or low pass filter. Amplifier 34 combines the detected signal 37 and the average of that signal on lines 38 and 39, respectively, for producing a sum signal 41 which is applied on line 10 to amplifier 71.

In practice, network 32 comprises a high pass filter, see FIG. 4, which combines the functions of averaging circuit 33 and amplifier 34 to produce signal 41 from the output of detector 31.

Frequency channel 30 comprises a series combination of a detector circuit 44, differentiator 45, rectifier 46 and averaging circuit 47 connected in series between the output of amplifier 22 and input line 11 to summing amplifier 71. This channel produces on line 11 the signal 50 having an amplitude that is an indication of the fundamental frequency of the seismic signal 36.

Threshold circuits 14 and 26 may, by way of example, be Schmitt trigger circuits which change operating states when the input signals applied thereto exceed a prescribed threshold level. Counter 25 may, by way of example, be a leaky integrator which increments a charge each time threshold circuit 14 changes operating states. The time constant of the integrator-counter is set so that a prescribed number of threshold crossings such as three must be detected by circuit 14 and counted with a prescribed time interval such as four seconds before the count in circuit 25 exceeds the threshold level of circuit 26. Alarm device 27 may, by way of example, be a lamp or a bell.

The foregoing sensing and processing circuit is described in the patent mentioned above and does not per se constitute this invention.

In accordance with this invention, additional channels for deriving average envelope and average variance signals as inputs to summing amplifier 71 are included within the broken line rectangle 52 and comprise switches 54 and 55 which selectively connect signal processing channels 56 (average envelope) and 57 (average variance) to the output of envelope detector 31 and a summing amplifier 34, respectively. When movable contacts 54a and 55a of the switches 54 and 55, respectively, are in the position shown in engagement with stationary contacts A, the switches are open and channels 56 and 57 are not included in processing circuit 23 and the processor functions to detect both footsteps and moving vehicles for actuating the alarm; when the movable contacts engage stationary contacts B, channels 56 and 57 are connected in the circuit which then operates to provide discrimination between human footsteps and moving vehicles as well as aircraft, thunder and the like. Contacts 54a and 55a are mechanically connected together as indicated by the broken line between them so that both engage either contacts A or B at the same time.

Channel 56 comprises an averaging circuit 59 similar to averaging circuit 33 for producing an output signal 60 that is the average value of envelope signals 37. The time constant of circuit 59 is 3 to 5 seconds. The output of circuit 59 is applied on line 17 as an input to a summing amplifier 68.

Channel 57 comprises a half-way rectifier 62 for clipping the negative going portion of the waveform 41 output from summing amplifier 34 and making it a unidirectional wave 63, and averaging circuit 65 which averages the output of rectifier 62 to produce a waveform shown at 66. The output of averaging circuit 65 is applied as the second input to summing amplifier 61. Averaging circuit 65 like circuit 59 may comprise a low pass resistance-capacitance type filter or integrating circuit of well known construction and has a time-contant of 3 to 5 seconds.

The outputs of circuits 59 and 65 on lines 17 and 16, respectively, correspond to the average envelope and average variance, respectively, and preferably are summed in summing amplifier 68, the output of which is applied to half-wave rectifier 69 which serves as a limiter to produce only a negative going signal on line 70 as an input to summing amplifier 71. The resultant signal on line 70 is a combination of effects of average envelope and average variance on the threshold level as described above, these effects being in the form of a negative going signal.

Summing amplifier 71 algebraically adds the signals on lines 10, 11 and 70 so that the threshold depressing effect of average variance on line 16 and the threshold elevating effect of average envelope on line 17 and average frequency on line 11 combine to permit the peak variance signal on line 10 to exceed the threshold only when produced by human footsteps. This is indicated by waveform 73 wherein the broken line $V_T$ represents the threshold level of circuit 14. Thus when switches 54 and 55 are closed with contacts 54a and 55a in the B position, the processor operates to give an alarm signal when human footsteps are detected and to produce no alarm signal from seismic signals produced by moving vehicles as well as aircraft, thunder, etc..

What is claimed is:

1. In a seismic signal processor comprising means responsive to a seismic signal for producing an envelope signal corresponding to the amplitude of said seismic signal, means responsive to said envelope signal for producing a signal corresponding to peak amplitude variance of the seismic signal, means responsive to said seismic signal for producing an average frequency signal having an amplitude corresponding to the average frequency of said seismic signal, means for algebraically summing said peak amplitude variance and average frequency signals to produce a first output, and means for comparing the value of said first output with a threshold reference and producing an alarm when the former exceeds the latter, the improvement comprising means responsive to said envelope signal for producing an average envelope signal corresponding to the average value of said envelope signal, means responsive to said peak variance signal for producing an average variance signal corresponding to the average value of said peak variance signal, and means for selectively inputting said average envelope signal and said average variance signal to said summing means together with said peak variance signal and said average frequency signal whereby to produce a second output, said comparing means comparing said second output with said threshold reference for producing an alarm when the former exceeds the latter.

2. The processor according to claim 1 in which said inputting means comprises a switch.

3. The processor according to claim 1 in which said inputting means comprises means for algebraically adding said average envelope signals and said average variance signal and means for limiting the output of said adding means.

4. A seismic signal processor comprising in combination means responsive to a seismic signal for producing an envelope signal corresponding to the amplitude of said seismic signal, means responsive to said envelope signal for producing a signal corresponding to peak amplitude variance of the seismic signal, means responsive to said seismic signal for producing an average frequency signal having an amplitude corresponding to the average frequency of said seismic signal, means responsive to said envelope signal for producing an average envelope signal corresponding to the average value of said envelope signal, means responsive to said peak variance signal for producing an average variance signal corresponding to the average value of said peak variance signal, means for deriving the algebraic sum of said peak amplitude variance and average frequency and average amplitude and average variance signals to produce an output, and means for comparing the value of said output with a threshold reference and producing an alarm when the former exceeds the latter.

* * * * *